United States Patent
Mc Keigue et al.

(10) Patent No.: US 6,509,082 B1
(45) Date of Patent: *Jan. 21, 2003

(54) STRUCTURED PACKING

(75) Inventors: Kevin Mc Keigue, Berkeley Heights, NJ (US); Ramachandran Krishnamurthy, Chestnut Ridge, NY (US); Hendrik Adriaan Kooijman, Tuebingen (DE)

(73) Assignee: The BOC Group, Inc., Murray Hill, NJ (US)

( * ) Notice: Subject to any disclaimer, the term of this patent is extended or adjusted under 35 U.S.C. 154(b) by 13 days.

This patent is subject to a terminal disclaimer.

(21) Appl. No.: 09/593,051

(22) Filed: Jun. 13, 2000

Related U.S. Application Data

(63) Continuation-in-part of application No. 09/344,647, filed on Jun. 25, 1999, now Pat. No. 6,280,819.

(51) Int. Cl.[7] .............................. B32B 3/10; B32B 3/28; B01D 47/00
(52) U.S. Cl. ..................... 428/137; 428/184; 261/105; 261/112.2; 261/DIG. 72
(58) Field of Search ................................ 428/182, 184, 428/174, 137; 261/112.2, 113, 105, DIG. 72

(56) References Cited

U.S. PATENT DOCUMENTS

| | | | |
|---|---|---|---|
| 4,186,159 A | 1/1980 | Huber | 261/112 |
| 4,597,916 A | 7/1986 | Chen | |
| 4,871,382 A | 10/1989 | Thorogood et al. | 62/18 |
| 5,350,566 A | 9/1994 | Stingaro | |
| 5,474,832 A | 12/1995 | Massey | 428/182 |
| 5,498,376 A | 3/1996 | St. Louis et al. | 261/113 |
| 5,632,934 A | 5/1997 | Billingham et al. | 261/112.2 |
| 5,921,109 A | 7/1999 | Billingham et al. | 62/643 |
| 6,280,819 B1 * | 8/2001 | Mc Keigue et al. | 428/137 |

FOREIGN PATENT DOCUMENTS

| | | | |
|---|---|---|---|
| EP | 0 036 944 A | 10/1981 | |
| EP | WO 97/16247 | 5/1997 | B01J/19/32 |
| EP | 0 858 366 B1 | 7/2000 | B01J/19/32 |

OTHER PUBLICATIONS

"Structured Packings Today and Tomorrow", Spiegel et al.,AIChE Spring Meeting, Atlanta (Mar. 5–9, 2000).
"Stretching the Capacity of StructuredPackings", Olujic et al.,AIChe Annual Meeting, Los Angeles, CA (Nov. 14, 2000).
"Structured Packings: An Overview:", Olujic, A.,AIChe Annual Meeting, Los Angeles, CA., (Nov. 16–21, 1997).
"Packed Column Internals", Chen, G. K., *Chemical Engineering*, pp. 40–51 (Mar. 5, 1984).
"Distillation Columns Containing Structured Packing", Fair et al.,*Chemical Engineering Progress*, No. 1, New York, (Jan. 1990).

* cited by examiner

*Primary Examiner*—Donald J. Loney
(74) *Attorney, Agent, or Firm*—Wan Yee Cheung; Salvatore P. Pace

(57) ABSTRACT

The present invention provides a structured packing comprising a plurality of corrugated sheets and a plurality of flat, planar members alternating with and located between the sheets to inhibit turbulence in vapor ascending through the structured packing. The plurality of planar members are positioned so that at least the lowermost horizontal edge of the planar members and the corrugated sheets are situated proximal to one another as viewed when said structured packing is in use. When the planar members have substantially the same length and width as the corrugated sheets, the planar members and the corrugated sheets have perforations sized to inhibit transverse liquid and vapor flow while but allowing transverse pressure equalization through the structured packing. The size and number of perforations can be optimized for air separation applications.

18 Claims, 2 Drawing Sheets

STRUCTURED PACKING

RELATED APPLICATIONS

This application in a continuation-in-part of application Ser. No. 09/344,647 filed Jun. 25, 1999 now U.S. Pat. No. 6,280,819.

BACKGROUND OF THE INVENTION

The present invention relates to a structured packing having particular application to a method of separating air in which the packing is formed of a plurality of corrugated sheets and a plurality of flat, planar members alternating with and located between the corrugated sheets to inhibit vapor turbulence. The planar members may be substantially the same size as the corrugated sheets or smaller in length than the corrugated sheets. When substantially the same length, the corrugated sheets and the flat, planar members have perforations sized to inhibit vapor and liquid flows while allowing for transverse pressure equalization through the structured packing. When the planar members are smaller in length one or more planar members may be present between the corrugated sheets.

Structured packing has found wide spread use in a variety of distillations including those involved in the separation of air into its component parts. Distillations are conducted within distillation columns filled with mass transfer elements to bring ascending vapor phases into intimate contact with descending liquid phases of mixtures to be separated. As the ascending phase rises and contacts the descending liquid phase, it becomes evermore enriched in the more volatile components of the mixture to be separated. At the same time the descending liquid phase becomes ever more concentrated in the less volatile components of the mixture to be separated. In such fashion, systems of distillation columns can be used to separate various mixture components. For instance, in case of air separation, nitrogen is separated from oxygen in a double distillation column unit. Argon is then separated from oxygen in an argon column that is attached to a lower pressure column of such double distillation column unit.

Structured packings are widely used as mass transfer elements within distillation columns due to their low pressure drop characteristics. Structured packings generally include corrugated sheets of material in which the sheets are placed in a side by side, relationship with the corrugations of adjacent sheets criss-crossing one another. In use, the liquid phase of the mixture to be separated is distributed to the top of the packing and spreads out throughout the packing as a descending film. The vapor phase of such mixture rises through the corrugations contacting the liquid film as it descends.

There have been many attempts in the prior art to increase the efficiency of structured packings, that is, to decrease the height of packing equal to a theoretical plate. Obviously, the lower the height, the more efficient the packing. At the same time, structured packing with a low HETP inherently has an increased pressure drop over less efficient packings. One such structured packing is disclosed in U.S. Pat. No. 4,597,916 in which the corrugated sheets are separated from one another by flat, perforated sheets that extend throughout the packing. It is believed that the flat perforated sheets of this prior packing increase efficiency by both providing additional interfacial area for vapor-liquid contact and by increasing turbulence in the vapor flow and therefore the degree of mixing between vapor and liquid phases. Unlike the present invention, transverse mixing is also increased by perforations that are specifically designed and sized to promote liquid and vapor flow in a transverse direction of the packing.

As will be discussed, the present invention is a structured packing that, unlike the prior art, is optimized not for efficiency, but rather, for smooth vapor flow. Through such optimization, it is possible to increase the capacity of the packing and therefore, use such packing in a more efficient cost effective manner.

However, the present packing inhibits transverse liquid and vapor flow thereby decreasing the degree of mixing. The decreased mixing is a significant factor that results in increased packing capacity.

SUMMARY OF THE INVENTION

The present invention provides a structured packing comprising a plurality of corrugated sheets and a plurality of flat, planar members alternating with and located between the sheets to inhibit turbulence in vapor ascending through said structured packing. The planar members may be sized with lengths and widths equal to those of the corrugated sheets or may be smaller in length than the corrugated sheets. The plurality of planar members are positioned so that at least one horizontal edge of the planar members and the corrugated sheets are situated proximal to one another as viewed when the structured packing is in use. As used herein, length and width refer to the dimensions of the structured packing, planar members and corrugated sheets also as viewed when the structured packing is in use. The length dimension is measured parallel to the longitudinal axis of the distillation column in which the structured packing is used.

In one embodiment of this invention where the planar members are substantially the same length as the corrugated sheets, each of the planar members and the corrugated sheets have perforations sized to inhibit transverse liquid and vapor flow while allowing pressure equalization. In another embodiment, one or more planar members or strips can be located between the corrugated sheets and may be perforated or non-perforated.

An example of this embodiment includes pairs of the planar members located between the corrugated sheets and spaced apart from one another so that the uppermost and the lowermost horizontal edge of the planar members and the corrugated sheets are aligned.

In those embodiments, having perforations each of the perforations have a diameter in a range of between about 5% and about 40% of the channel width of the corrugations in the corrugated sheets as measured between adjacent peaks or troughs of the corrugations. This diameter can be between about 5% and about 20% of the channel width. Preferably the diameter is about 10% of the channel width of corrugations. Furthermore, the perforations can constitute an open area of the planar members in a range of between about 5% and about 20% of a total area of the planar members. Such open area of the planar members can be between about 7% and about 15% of the total area. Preferably, the open area of the planar members is about 10% of the total area.

The length of the planar members may be smaller than the length of the corrugated sheets. In this embodiment, it is preferred that the length be less than about one-third, more preferably less than one-fifth, the length of the corrugated sheets. When the length of the planar members are less than about one-third of the length of the corrugated sheets, sufficient pressure equalization can normally occur and perforations are generally not required.

It has been found that a structured packing designed in the manner set forth above functions with a slightly higher HETP than structured packings of the prior art. This is surprising considering the fact that the packing with the intermediate planar members has a greater surface area than similar packing not incorporating such planar members. A further unexpected feature is that all packings of each embodiment of the present invention flood at higher vapor rates. There are various criteria that are used to describe the flooding condition, for instance, excessive pressure drop. In all cases if HETP is plotted against F-Factor (where F-Factor is a product of the superficial vapor velocity and the square root of the vapor density) flooding is evidenced by a rapid rise of the slope of the curve. Such a rise in HETP is indicative of the vapor supporting the descending liquid thereby choking the column and disrupting the separation. This increase in the flooding point allows higher flow rates through the column and therefore for a given volume of packing, greater production. This allows for thinner columns using less packings or columns that can handle a greater throughput. The reason for such operation is that the planar member and opening design of the present invention are believed to inhibit turbulence in the vapor now ascending through the structured packing.

BRIEF DESCRIPTION OF THE DRAWINGS

While the specification concludes with claims distinctly pointing out the subject matter that Applicants regard as their invention, it is believed the invention would be better understood when taken in connection with the accompanying drawings in which:

DETAILED DESCRIPTION

Figure 1:
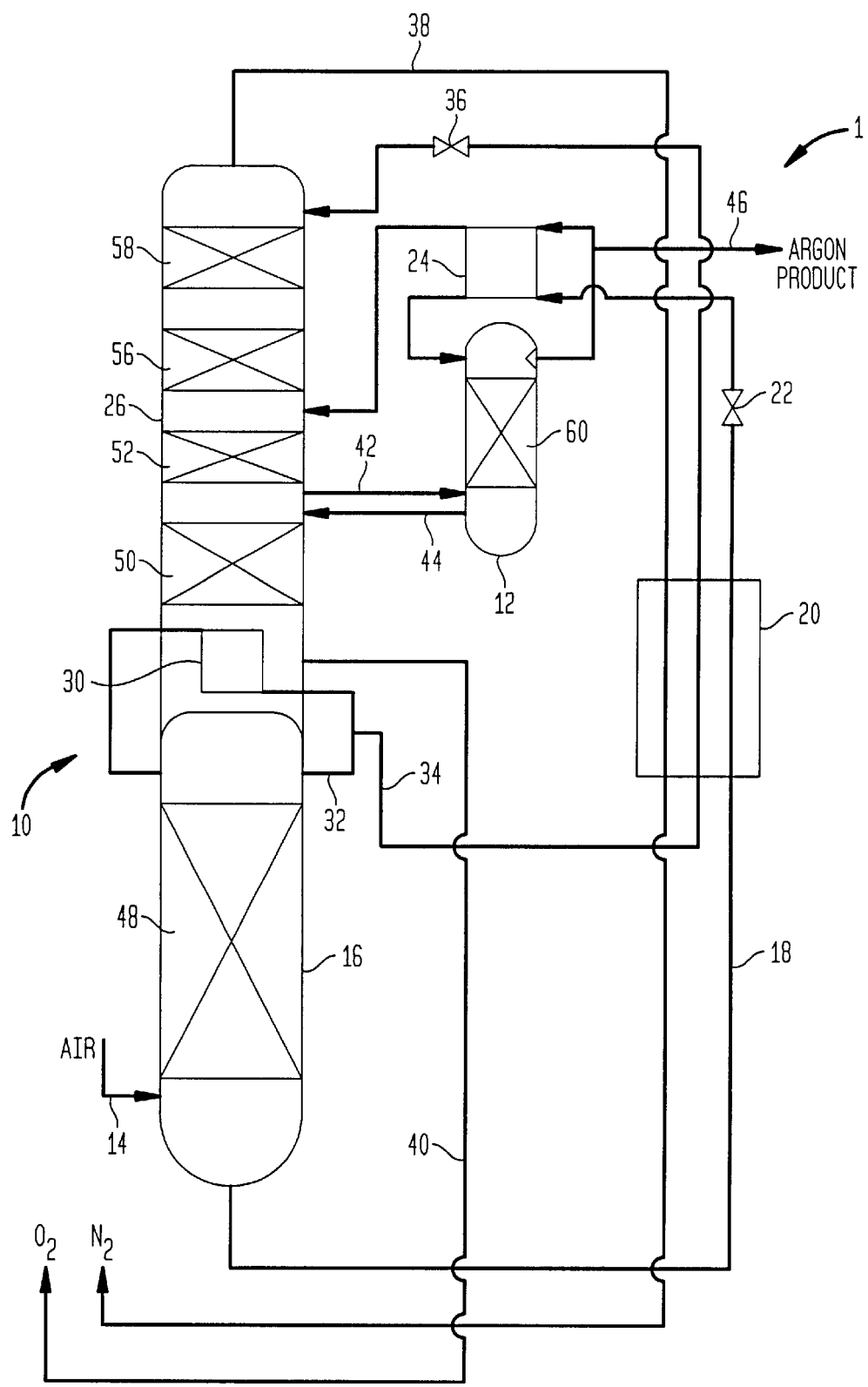
FIG. 1 is a schematic view of an air separation plant utilizing a structured packing in accordance with the present invention.

With reference to FIG. 1, an air separation plant 1 is illustrated. Air separation plant 1 has a double distillation column unit 10 and an argon column 12. Although not illustrated, but as would be known by those skilled in the art, air separation plant 1 would additionally have a main heat exchanger to cool the air to a rectification temperature against warming product streams to ambient temperatures. Additionally, a main air compressor and a pre-purification unit would also be provided to compress the air and then to purify the compressed air of impurities such as carbon dioxide and moisture.

Air as a feed stream 14 enters a higher pressure column 16 of double distillation column unit where it is rectified to produce a nitrogen rich tower overhead and a crude liquid oxygen column bottoms. Stream 18 of the crude liquid oxygen column bottoms is subcooled within a subcooling unit 20 and then expanded across an expansion valve 22. The expansion reduces the temperature of stream 18 so that it can serve as coolant for a head condenser 24 used to form reflux for an argon column 12. The crude liquid oxygen obtained within stream 18 is vaporized within head condenser 24 and then fed into a lower pressure column 26 (of double distillation column unit 10) for further refinement. The further refinement produces an oxygen-enriched column botttoms and a nitrogen vapor tower overhead within the lower pressure column 26.

Reflux for both the higher and lower pressure columns 16 and 26 is provided by condensing the nitrogen-rich tower overhead within a condenser reboiler 30 to produce higher and lower pressure column reflux streams 32 and 34. Lower pressure reflux stream 34 is subcooled within subcooling unit 20 and reduced in pressure by expansion valve 36 prior to its introduction into lower pressure column 28. The nitrogen vapor tower overhead is removed as a nitrogen stream 38 which serves in subcooling unit 22 to subcool stream 18 and lower pressure column reflux stream 34. An oxygen product stream 40 may be removed as a liquid from a bottom region of lower pressure column 28. Both the nitrogen stream 38 and the oxygen product stream 40 may be introduced into the main heat exchanger for cooling the incoming air.

At an intermediate location of lower pressure column 26, an argon rich vapor stream 42 may be removed and introduced into argon column 12. An argon rich tower overhead is produced within argon column 12. An oxygen rich column bottoms is also produced which is returned as a liquid stream 44 back to lower pressure column 26. An argon product stream 46 may be removed from part of the condensate of head condenser 24.

In order to effectuate the distillation, ascending vapor phases and descending liquid phases must be brought into contact with one another by mass transfer elements. For instance, higher pressure column 16 is provided with transfer elements 48 which may be trays or structured packings. As vapor rises within mass transfer elements 48, it becomes ever more rich in nitrogen until it reaches the top of higher pressure column 16. There, the vapor is condensed and in part returned as higher pressure column reflux stream 32 to higher pressure column 16. The nitrogen rich tower overhead, as a liquid, descends within higher pressure column 16 and becomes ever more richer in oxygen, through contact with the ascending vapor, to produce the crude liquid oxygen column bottoms.

Vapor rising within lower pressure column 28 passes through beds 50, 52, 56 and 58 which are formed of structured packing. The ascending vapor phase, initiated by boiling the oxygen rich liquid, rises through the column and becomes ever more rich in nitrogen to form the nitrogen vapor tower overhead. The descending liquid phase is initiated by the reflux of higher pressure column stream 34. This liquid becomes ever more rich in oxygen as it descends.

Argon column 26 is provided with a mass transfer elements 60 which again, are a structured packing. The vapor phase initiated by introduction of argon rich vapor stream 42 to becomes ever more rich in argon. The reflux introduced into the top of argon column 26 becomes ever more rich in oxygen as it descends.

Figure 2:
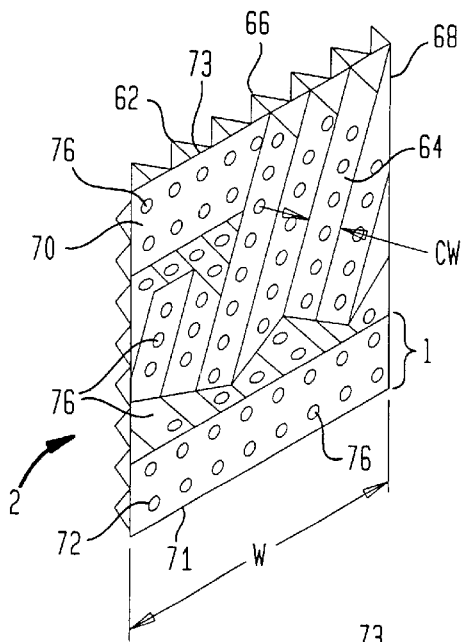
FIG. 2 is a fragmentary view of a structured packing in accordance with one embodiment of the present invention for use in the air separation plant illustrated in FIG. 1.
Figure 3:
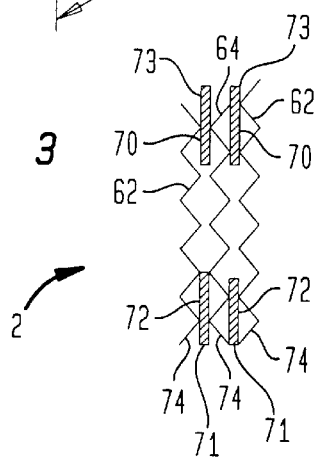
FIG. 3 is a fragmentary, side elevational view of the structured packing shown in FIG. 2.

With reference to FIGS. 2 and 3, structured packing 2 in accordance with one embodiment of the present invention is illustrated. While structured packing 2 is fabricated from rectangular sheets, other shapes can be used as evident to one skilled in the art. Structured packing 2 consists of repeating pairs of corrugated sheets 62 and 64 which contain corrugations 66 and 68, respectively. The repetition of corrugated sheets 62 and 64 produce either the top or lower half of a bed of packing. Corrugations 66 and 68 are inclined at an angle to the vertical, for instance 30 or 45°, or even greater in an appropriate application. Corrugated sheets 62 and 64 are positioned so that corrugations 66 and 68 criss-cross one another.

Flat, planar members 70 and 72 alternate with and are positioned between corrugated sheets 62 and 64. Preferably, each of planar members 70 and 72 sized with a width "W" equal to the width of corrugated sheets 62 and 64 and a length "l" less than that of corrugated sheets 62 and 64. While at least one planar member must be present, this embodiment illustrates the use of two planar members in place of a single planar member in an upper and lower strip configuration as viewed when the structured packing is in use. Planar members 70 and 72 may or may not be perforated depending on the length of the planar members. When the height of planar members 70 and 72 are at least less than one-third the length of the corrugates sheets, perforations are normally not necessary. Generally, the width of the planar members will be substantially the same as the corrugated sheets. As illustrated, the lowermost horizontal edges 71 are aligned with those of the corrugated sheets 62 and 64 and the uppermost horizontal edges 73 are aligned with those of the corrugated sheets 62 and 64. It is understood however that there might be some misalignment in the nature of 5 mm and hence, such lowermost and uppermost horizontal edges in any embodiment are situated at least near or proximal to those of corrugated sheets 62 and 64.

Although two planar members 72 and 70 are illustrated the present invention encompasses an embodiment in which upper planar members 70 are deleted. In such a possible embodiment, the remaining planar members 72 are positioned so that the lowermost horizontal edges thereof are aligned with those of corrugated sheets 62 and 64.

As illustrated, corrugated sheets 60 and 62 and planar members 70 and 72 are provided with perforations 76 although perforations in the planar members may not be necessary. Such perforations are employed to prevent transverse vapor and liquid flows while allowing transverse pressure equalization through the structured packing.

Figure 4:
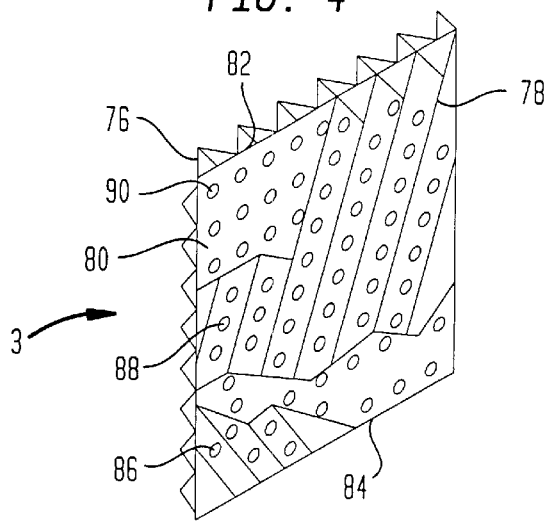
FIG. 4 is an alternative embodiment of a structured packing in accordance with the present invention.

With additional reference to FIG. 4, structured packing 3 is of the type having repeating pairs of corrugated sheets 76 and 78 separated by or alternating with a flat, planar member 80 which has uppermost and lowermost edges 82 and 84 which are substantially coincident with the uppermost and lowermost edges of corrugated sheets 76 and 78. Planar member 80 is sized with lengths and widths equal to those of corrugated sheets 76 and 78. Additionally, corrugated sheets 76 and 78 and planar members 80 are provided with perforations 86, 88 and 90. In this embodiment, perforations 86, 88 and 90 must be present and sized to prevent transverse liquid and vapor flows and to permit pressure equalization. In such manner, smooth rather than turbulent vapor flows are promoted to produce the advantageous operation described above. In case of air separation, each of the perforations 86,88 and 90 can be sized to have a diameter in a range of between about 5% and about 40% of channel width "CW" as shown in FIG. 2 (The channel width is measured between the corrugations from trough to through or peak to peak). This diameter is more preferably between about 10% and about 25% of the channel width CW and is most preferably about 15% of the channel width CW.

The planar members and the corrugated sheets can be made from several different materials including metals and metal alloys; plastics; ceramics: or composite materials depending on the application of use. In addition, the planar members can be textured or smooth and made from solid sheets, woven materials or knitted materials. Generally, the planar members are made from the same materials as the corrugated sheets.

A further optimization for air separation is to control the number of perforations and therefore, their open area contribution. Preferably, perforations 86, 88 and 90 can constitute an open area of the corrugated sheets 76 and 78 and the planar member 80 in a range of between about 5% and about 20% of a total area thereof. In case of corrugated sheets 76 and 78, such open area is computed by multiplying the length and width of each of corrugated sheets 76 and 78. More preferably such open area can be between about 7% and about 15% of the total area and most preferably, the open area is about 10% of the total area.

Structured packing 2 and 3 were tested against structured packing obtained from Sulzer Chemtech Ltd, Winterthur, Switzerland, as model Mellapak 500.YL. This packing has a density of about 500 $m^2/m^3$. The structured packing 2 and 3 was then fabricated out of corrugated sheets that would otherwise have had the same density but for planar members 70, 72, and 80, respectively, and therefore were of slightly greater density. A greater separation efficiency was therefore to have been expected.

Testing, however, showed that with the type of mixtures to be separated in an air separation plant, either in a lower pressure column, such as lower pressure column 26, or in an argon column, such as argon column 12, at operational ranges of F-Factor prior to flooding, structured packing 2 had an HETP of about 15% greater than the Mellapak 500.YL packing. Structured packing 3 (more dense than structured packing 2) had an HETP of about 25% greater than the Mellapak 500.YL packing. Moreover the flooding points of structured packings 2 and 3 where about 25% and about 40% greater than the Mellapak 500.YL packing.

In addition to the packing described above having linear corrugations, the present invention is also useful with corrugated sheets of varying configurations. For example, corrugated sheets can be used which have curved corrugations near the top and bottom of the sheets but straight near the middle, such as those found in Mellapak Plus 752 Y packing available from Sulzer Chemtech or those having other non-linear corrugations such as found in Flexipac HC packing available from Koch-Glitsch, Inc.

The structured packings of the present invention have been illustrated for use in air separation applications. However, the present structured packings can be employed in numerous distillation applications such as in chemical and petroleum separations.

While the present invention has been described with reference to a preferred embodiment, as will occur to those skilled in the art, numerous changes, additions and omissions may be made without departing from the spirit and scope of the present invention.

We claim:

1. A structured packing comprising:
    a plurality of corrugated sheets; and
    a plurality of flat, planar members alternating with and located between said corrugated sheets to inhibit turbulence in vapor ascending through said structured packing;
    said plurality of planar members positioned so that at least one horizontal edge of said planar members is situated at least proximal to at least one horizontal edge of said corrugated sheets as viewed when said structured packing is in use; and
    provided that, when said planar members have lengths and widths substantially equal to those of said corrugated sheets, said corrugated sheets and said planar members have perforations sized to inhibit transverse liquid and vapor flows while allowing pressure equalization.

2. The structured packing of claim 1 wherein said planar members are smaller in length than said corrugated sheets.

3. The structured packing of claim 2 wherein the length of said planar members located between said corrugated sheets is less than one-third the length of said corrugated sheets.

4. The structured packing of claim 3 wherein the length of said planar members is less than one-fifth the length of said corrugated sheets.

5. The structured packing of claim 2 wherein pairs of said planar members are located between said corrugated sheets and spaced apart from one another so that the uppermost and the lowermost horizontal edges of said planar members and said corrugated sheets are aligned.

6. The structured packing of claim 1 wherein each of said perforations have a diameter in a range of between about 5% and about 40% of a channel width of corrugations of said corrugated sheets as measured between adjacent peaks or troughs of said corrugations.

7. The structured packing of claim 6 wherein said diameter is between about 10% and about 25% of said channel width.

8. The structured packing of claim 7 wherein said diameter is about 15% of said channel width of corrugations.

9. The structured packing of claim 1 wherein said perforations constitute an open area of said planar members in a range of between about 5% and about 20% of a total area of said planar members.

10. The structured packing of claim 9 wherein said open area of said planar members is between about 7% and about 15% of said total area.

11. The structured packing of claim 10 wherein said open area of said planar members is about 10% of said total area.

12. The structured packing of claim 6 wherein said perforations constitute an open area of said planar members in a range of between about 5% and about 20% of a total area of said planar members.

13. The structured packing of claim 12 wherein said open area of said planar members is between about 7% and about 15% of said total area.

14. The structured packing of claim 13 wherein said open area of said planar members is about 10% of said total area.

15. The structured packing of claim 2 wherein said planar members are nonperforated.

16. The structured packing of claim 15 wherein said planar members are substantially the same width as the width of said corrugated sheets.

17. A structured packing comprising:

a plurality of corrugated sheets; and a plurality of planar members alternating with and located between said corrugated sheets and positioned so as to inhibit turbulence in vapor ascending through said structured packing;

said planar member having lengths and widths substantially equal to said corrugated sheets and having perforations sized to inhibit transverse liquid and vapor flow while allowing transverse pressure equalization through said structured packing.

18. A structure packing comprising:

a plurality of corrugated sheets and a plurality of planar members with a pair of said planar members positioned in an upper and lower strip configuration as viewed when the structured packing is in use and alternating with and located between said corrugated sheets;

the length of said planar members being less than one-third the length of said corrugated sheets and positioned to inhibit turbulence in vapor ascending through said structured packing while allowing transverse pressure equalization through said structured packing.

* * * * *